United States Patent [19]
Erickson

[11] Patent Number: 5,327,220
[45] Date of Patent: Jul. 5, 1994

[54] IR INTERFEROMETRIC APPARATUS AND METHOD FOR DETERMINING THE THICKNESS VARIATION OF AN OPTICAL PART WHEREIN SAID OPTICAL PART DEFINES NEWTON INTERFERENCE FRINGE PATTERNS

[75] Inventor: David J. Erickson, Huntington Beach, Calif.

[73] Assignee: O.C.A. Applied Optics, Inc., Garden Grove, Calif.

[21] Appl. No.: 905,042

[22] Filed: Jun. 26, 1992

[51] Int. Cl.$^5$ .............................................. G01B 9/02
[52] U.S. Cl. ..................................... 356/353; 356/359
[58] Field of Search ............... 356/345, 346, 355, 356, 356/357, 358, 382, 359, 360

[56] References Cited
U.S. PATENT DOCUMENTS
4,815,856  3/1989  Bruce .................................. 356/357

Primary Examiner—Samuel A. Turner
Assistant Examiner—Robert Kim
Attorney, Agent, or Firm—Joseph R. Dwyer

[57] ABSTRACT

An apparatus and method for testing variations in thicknesses of an optical part comprising an interferometer having a monochromatic light source (laser) which focuses a probe beam into the optical part being tested and detects a standing fringe pattern (Newton Fringes) arising through the interaction of two wavefronts produced by the reflection off the front and back surfaces of the optical part. These fringes may be circular or parallel depending upon the optical power of the probe beam. By observing the expansion and contractions of the interference rings, variations in the thickness of the part can be determined. By counting the number of interference peaks produced at the center of the fringe pattern, during relative movement between the optical part and the beam, a direct measurement of the optical part's thickness variations can be made. The direction of the thickness change is monitored by observing the slope of the intensity variation at the first ring of the interference pattern. A complete mapping of the variations in thickness of the part can be generated.

16 Claims, 5 Drawing Sheets

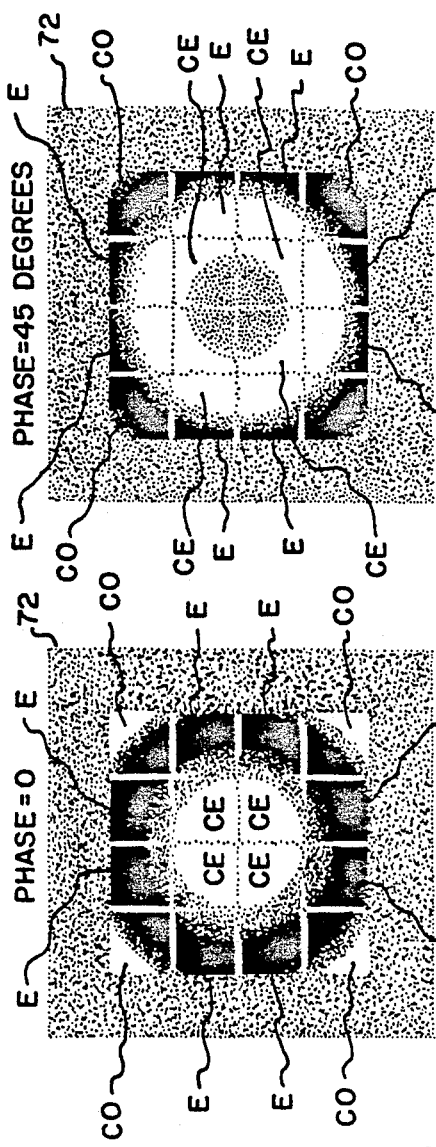
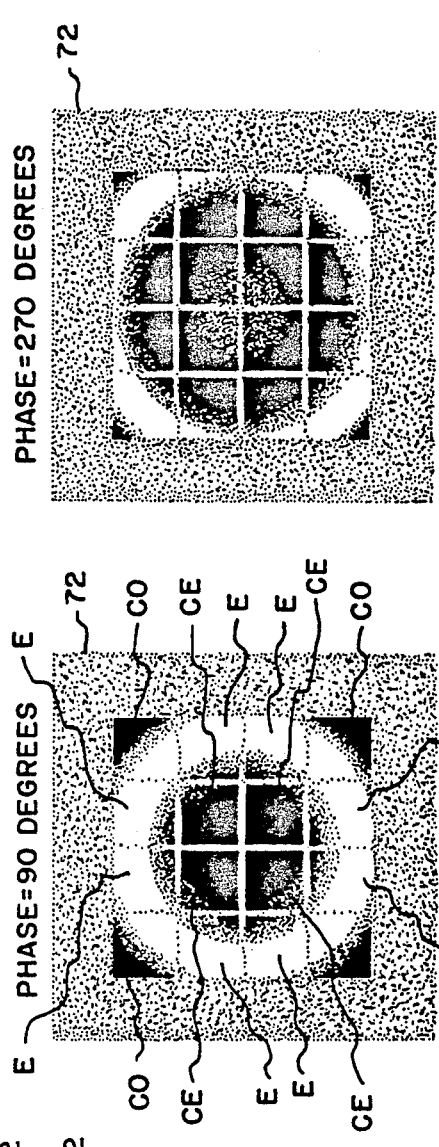
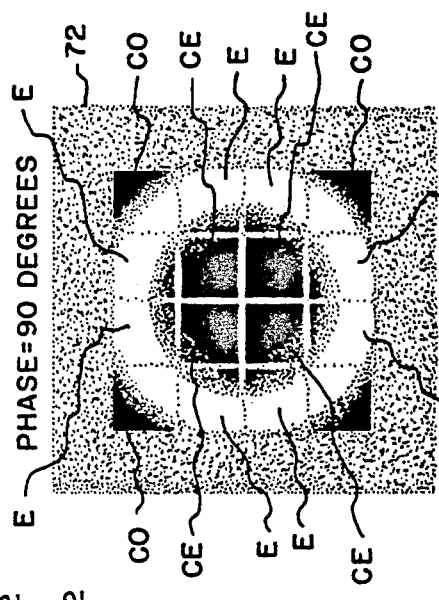
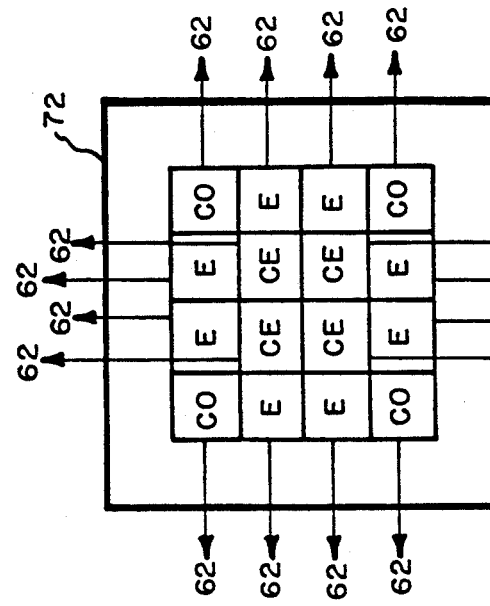

t = THICKNESS
Δt = THICKNESS VARIATION
n = REFRACTIVE INDEX
OPD = OPTICAL PATH DIFFERENCE

IR INTERFEROMETRIC APPARATUS AND METHOD FOR DETERMINING THE THICKNESS VARIATION OF AN OPTICAL PART WHEREIN SAID OPTICAL PART DEFINES NEWTON INTERFERENCE FRINGE PATTERNS

BACKGROUND OF THE INVENTION

This invention relates, in general, to interferometric characterization of optical elements and is specifically directed to an interferometric thickness test apparatus and method for measuring the thickness variations of optical parts, such as, IR windows, corrector plates, domes and conformal windows.

A variation in thickness of these IR optical parts produce a wavefront distortion which is potentially very detrimental to the performance of the systems in which they are used, so testing for thickness variations of an IR optical part and producing a map showing locations of any thickness variations is highly desirable.

Commercially available mid-wave IR interferometers (10.6 micron wavelength) have a limited ability to measure thickness variations in such IR optical parts. They require precise positioning relative to the surface of the optical part and its radius of curvature. If the optic being tested is in the mid or near-IR wavelength, or the transmitted wavefront accuracy requirement is small, their inherent insensitivity reduces their usefulness for thickness uniformity testing. Hence, there is a need for making a direct, non contact, measurement of the thickness uniformity of optical parts without the need of any critical alignment of the test apparatus. There is also a need for providing a map or profile of any variations in thickness in the optical parts.

SUMMARY OF THE INVENTION

The apparatus and method which fulfills the foregoing need comprises an interferometer having a monochromatic light source (laser) which focuses a probe beam into an optical part and detects a standing fringe pattern (Newton Fringes) arising through the interaction of two wavefronts produced by the reflection off the front and back surfaces of the optical part. These fringes may be circular or parallel depending upon the optical power of the probe beam. By observing the intensity fluctuations of the fringes, is, the expansion and contractions of the interference rings, variations in the thickness of the part can be determined. By counting the number of interference peaks produced at the center of the fringe pattern, during relative movement between the optical part and the beam, a direct measurement of the optical part's thickness variations can be made. For circular fringe patterns, the direction of the thickness change is monitored by observing the slope of the intensity variation at the first ring of the interference pattern. A complete mapping of the variations in thickness of the part can be generated.

As will be apparent to those skilled in the art, this apparatus and method is extremely accurate. Thickness variations in the order of microinches or less can be measured if an appropriate operating wavelength is selected.

As will be shown hereinafter, the optical path difference with a standing fringe used in this invention has a significant advantage over the optical path difference of a transmitted wavefront method of the prior art.

BRIEF DESCRIPTION OF THE DRAWINGS

FIG. 3 is an illustration of an IR detector divided into squares and connected to a computer, FIGS. 3a-3d are illustrations of the fringe pattern formed by the dome under test.

DETAILED DESCRIPTION OF THE PREFERRED EMBODIMENT

Figure 1:
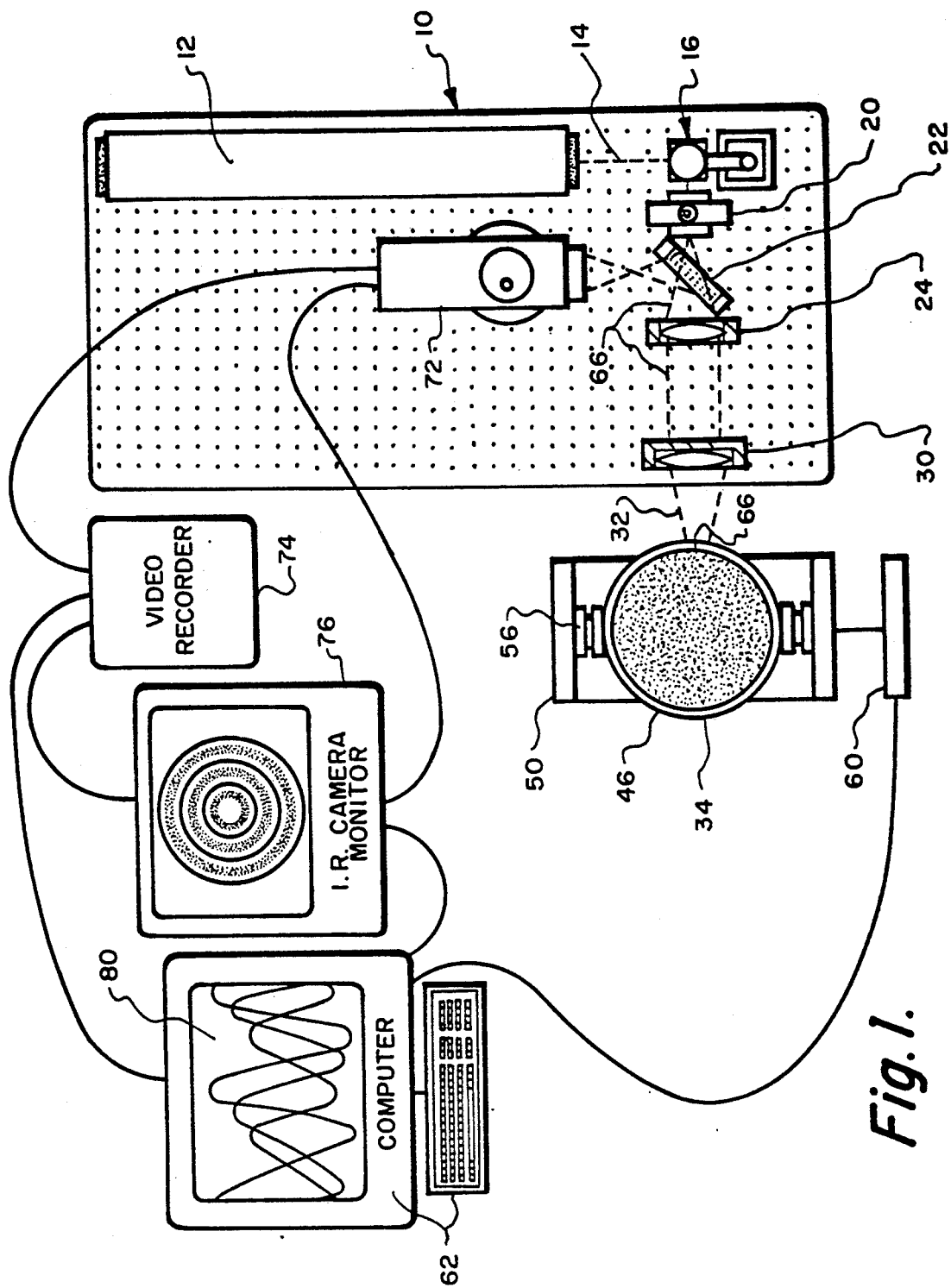
FIG. 1 is a schematic illustration of the apparatus for measuring thickness uniformity of an IR dome under test in accordance with this invention.
Figure 2:
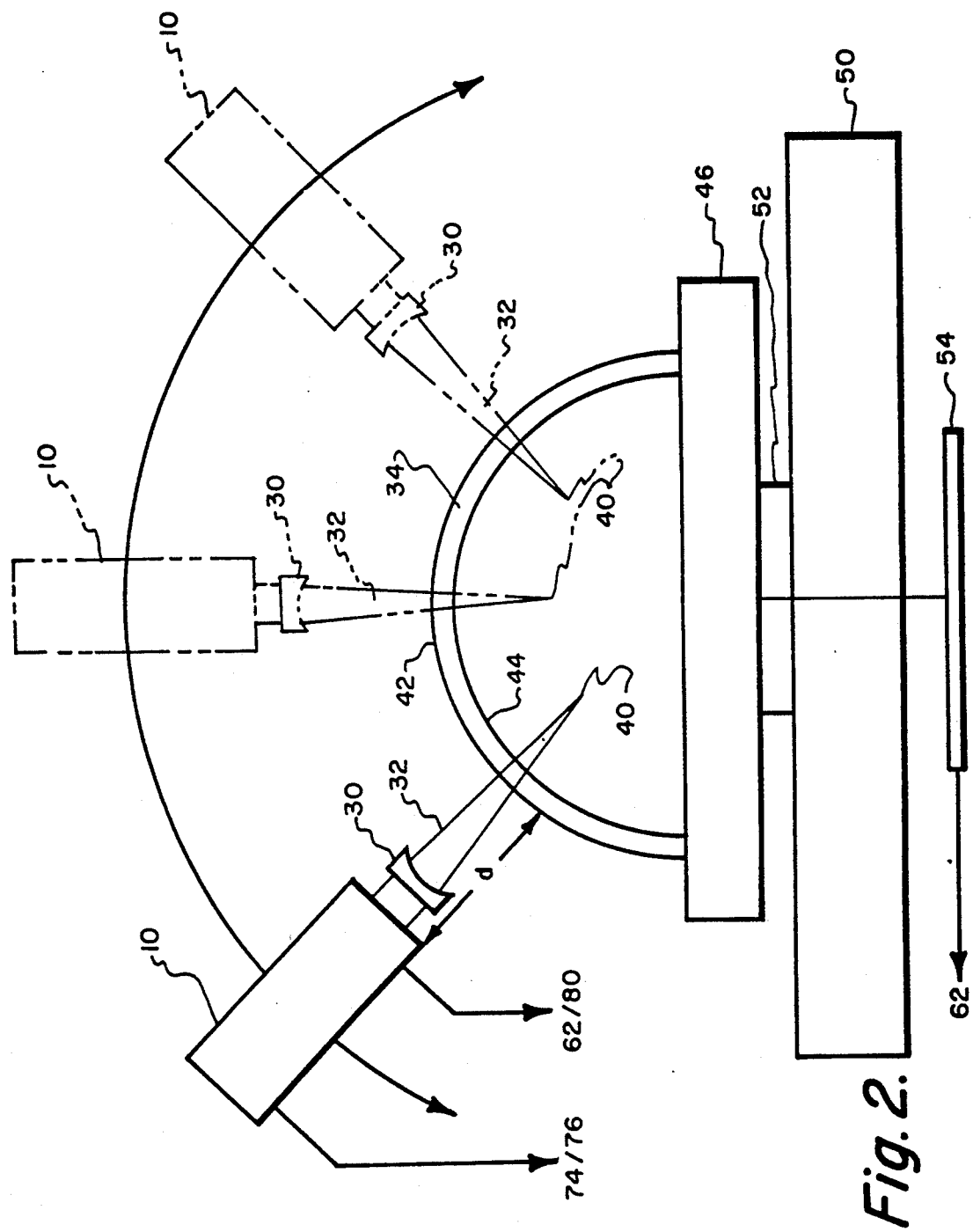
FIG. 2 is a schematic illustration of the converging beam penetrating an IR dome and the relative motion between the interferometer and the dome.
Figure 4:
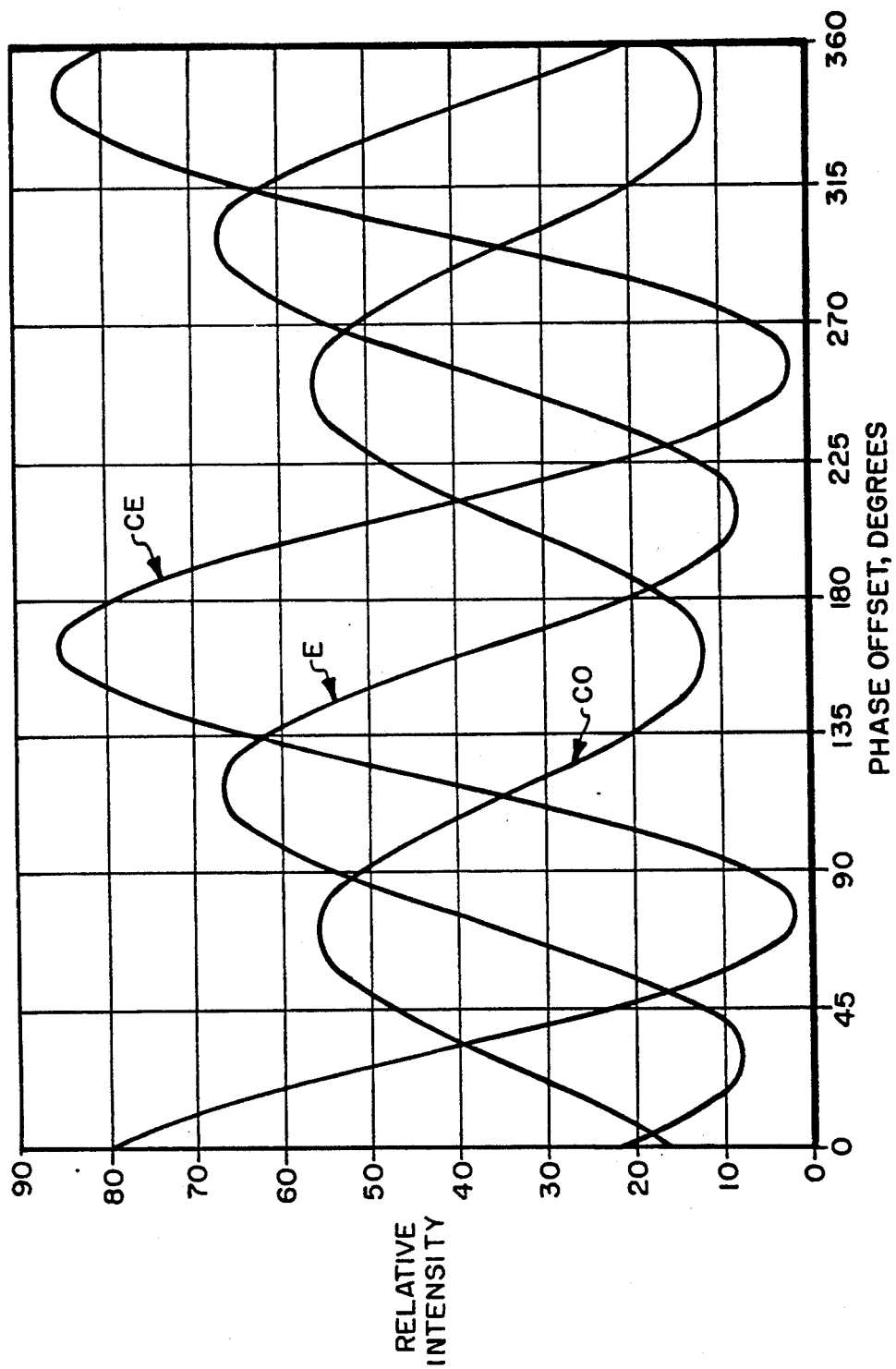
FIG. 4 is typical graph generated by the fringe pattern; relative intensity variable profile over time.

FIGS. 1 and 2 show an interferometer 10 which comprises a laser generator 12 as a monochromatic light source which directs its output beam 14 to beam stearing optics 16 through a spatial filter 20, through a beam splitter 22, a collimating optic 24 and a focus optic 30 which produces a probe beam 32, shown as a converging beam, impinging on an optical part under test, such as, an IR dome 34. FIG. 2 shows the focal point 40 of beam 32 and the inner and outer dome surfaces 42 and 44.

The dome 34 is positioned on plate 46 on a rotatable base 50 and bearing 52 with a position encoder 54 (FIG. 2). As shown in FIG. 1, base 50 has a gimbal 56 holding plate 46 so that between the rotation of the base 50 and rotation of the gimbal 56, the entire hemisphere of the dome 34 is exposed to the beam 32. A position encoder 60 is also attached to the gimbal 56 and both are connected to a computer 62 to register the position of the dome as it is being rotated. The mapping of the thickness variations may be indexed by X-Y coordinates as the part is being rotated or by raster scanning.

Gimbal 56 is not shown in FIG. 2 because of the showing of the rotation of the interferometer 10 with respect to the dome. FIG. 2 does show, however, how the distance d between the interferometer and the dome may vary.

The beam 32 penetrates the dome 34 so that two wavefronts are produced by reflection at the front and back surfaces 42 and 44 to generate fringe patterns 66 which are reflected as a reflective beam through the focus optic 30, collimater 24 and beam splitter 22. These two surfaces form an interferometer cavity and the position of these surfaces within the beam of the interferometer is not critical. The reflected beam is directed by the beam splitter 22 to an InSb IR detector array 72 which, in turn, is connected to a video recorder 74 and camera monitor 76 and to the computer 62. The computer 62 is also connected to a second monitor 80 for displaying intensity variations of the fringe patterns during relative motion between the interferometer 10 and the dome which will now be explained in connection with FIGS. 3, 3a-3d and 4.

Each bright and dark ring pair as shown in monitor 76 is referred to as a "fringe". The computer monitor 80 shows the integrated energy, that is, expansion or contraction of the intensity pattern as the optical part moves relative to the beam. One fringe causes the sinusoidal waveforms are shown in monitor 80 to proceed through one full cycle. Counting fringes, therefore, is a matter of monitoring the number of cycles or fractions of a cycle of the sinusoidal waveform.

Turning now to FIGS. 3 and 3a–3d where the reflected beam is shown on the IR detector 72. The detector 72 is divided into an array of sixteen areas (squares) with a group of four center areas CE, a group of eight edge areas E and a group of four corner areas CO. As shown in FIG. 3, each of these areas of each group are connected to the computer 62 so that the light intensity of each group of the areas is detected, counted, averaged, measured and displayed on monitor 80.

As shown in FIGS. 3a–3d, which may be considered a print out of the display in monitor 76, the fringe pattern varies, in the example shown, at the center area group CE from very light to very dark in FIG. 3c and then lightens in FIG. 3d. Actually these figures show the center of the fringe pattern growing larger with a dark center emerging in FIG. 3b and increasing darkness in FIG. 3c to the emerging of a new light center in FIG. 3d to indicate a change in thickness of the optical part. An increasing center fringe ring indicates the optical part is increasing in thickness and a decrease or collapse of the fringe ring in the center indicates a decrease in thickness of the optical part as the beam moves across the optical part surface.

As shown in FIG. 3, the center areas CE, the edge areas E and the corner areas CO each generate electrical signals representing the intensity of the light being measured and are each connected to the computer 62. The signals of each of the areas of each group are averaged and displayed by the signals shown in FIG. 4. In this Fig, the large peaks are signals (sum curves CE) from the center group CE, the lesser peaks are signals (sum curves E) from the edge group E and the smaller peaks are signals (sum curves CO) from the corner group CO. These signals indicate an increase in thickness in the dome at this particular point as the beam moves because the edge group down slope leads the down slope of the center group. If there was a decrease in thickness at this point in the dome, the down slope of the edge group would trail the down slope of the center group.

More specifically, the direction of thickness change is determined by the slope of the edge detector sum curve E. If, at the peak of the center detector sum curve CE, the E curve has a negative slope, the thickness is increasing. At a minimum of sum curve CE, if the sum curve E slope is positive, again, thickness is increasing. While, at CE peaks and minimums where the E slopes are positive and negative, respectively, the thickness is decreasing.

Figure 6:
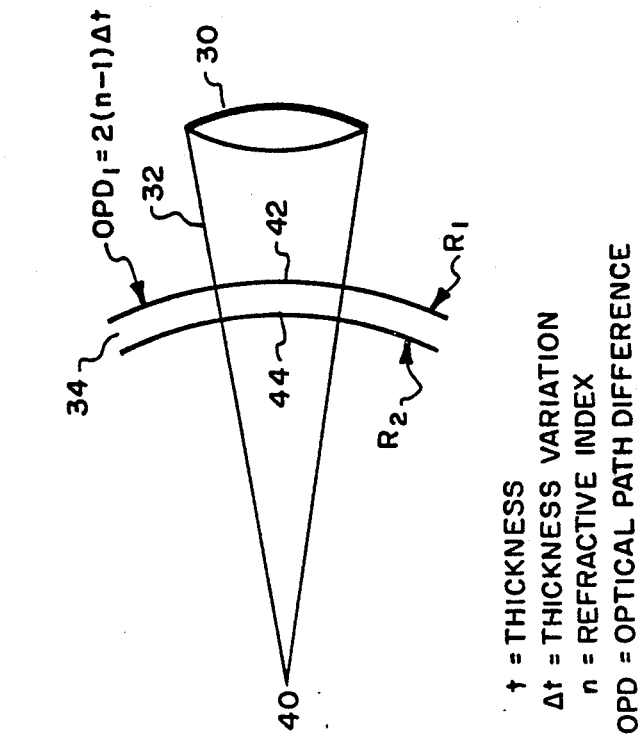
FIG. 6 is a schematic illustration of the standing fringe method to compare the prior art and the present invention.
Figure 5:
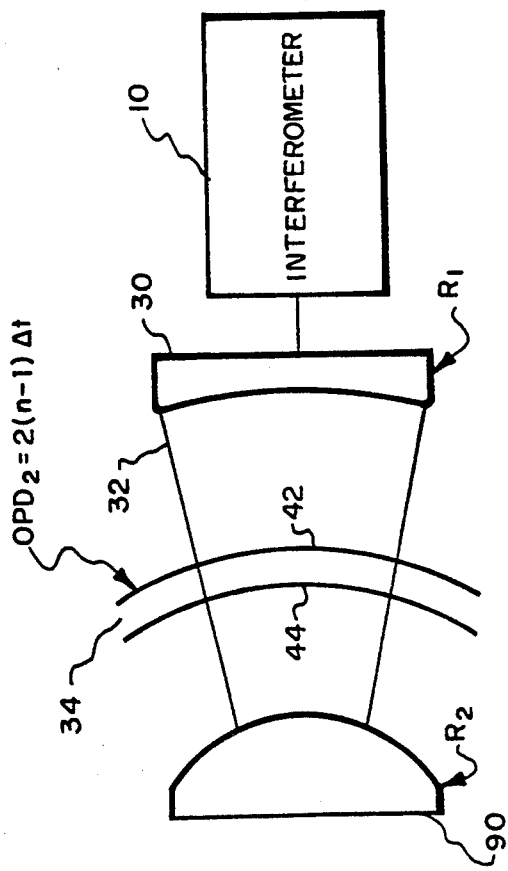
FIG. 5 is a schematic illustration of the transmitted wavefront method of the prior art.

In FIGS. 5 and 6, those items performing the same or similar functions as in the prior figures are given the same reference numerals to simplify the description.

Referring now to FIG. 5, which shows the prior art method having a transmitted wavefront, it can be seen that the focus optic 30 focuses beam 32 through dome 34 and onto a reference optic 50. Surfaces $R_1$ on the focus optic 30 and surface $R_2$ on the reference optic 90 form an optical cavity with an optical path difference (OPD) $OPD_2$ of:

$$OPD_2 = 2(n-1)\Delta t$$

where t = thickness
Δt = thickness variation
n = refractive index
OPD = optical path difference As shown in FIG. 6, the $OPD_2$ of the standing fringe method of this invention is:

$$OPD_1 = 2n\Delta t$$

since the surfaces themselves $R_1$ and $R_2$ of the dome 34 provide the optical cavity.

Thus, comparing the two test methods by the ratio:

$$\frac{2n\Delta t}{2(n-1)\Delta t} = \frac{n}{(n-1)}.$$

it can be seen that for germanium, having a refracted index of 4, the advantage of this invention is 4 to 3 over the prior art:

$$4/(4-1) = 4/3$$

and glass, having a refracted index of 1.5, the advantage of this invention over the prior art is 3 to 1:

$$1.5/(1.5-1) = 3$$

From the foregoing, it can be seen that a new apparatus and method of testing optical parts for thickness variations has been disclosed, that the method and apparatus does not involve contact with the optical part, that the method and apparatus will test optical parts which have an optical power and that the method and apparatus will test all types of optical parts, flat or curved, and since it is a non-contact system, the method and apparatus can be used to test optical parts already in place in a system without removing the parts from the system.

I claim:

1. An IR interferometric thickness test apparatus for determining any variation in thickness of an IR optical part under test comprising,
    a monochromatic optical system generating and focusing a converging monochromatic beam through the optical part and generating a reflected coincident return beam containing standing interference Newton fringes due to reflections off the inner and outer surfaces of the optical part,
    said optical system being spaced from said optical part,
    said surfaces forming an interferometer optical cavity and the position of these surfaces within the beam is not critical,
    a detector for receiving said interference fringes and measuring the light intensity of the fringes and generating signals as a function of light intensity and thickness variations of the optical part, and
    means for providing relative motion between said interferometer and said optical part.

2. The apparatus as claimed in claim 1 further including means for indexing the position of said beam relative to said optical part to map each change in optical thickness in said part.

3. The apparatus as claimed in claim 2 wherein said detector is divided into groups containing areas which can define the fringe pattern and provide signals representing the light intensity on said detector.

4. The apparatus as claimed in claim 3 wherein said groups generated signals which can be determinative of an increase or decrease in the optical thickness of said optical part.

5. The apparatus as claimed in claim 4 wherein said means for providing relative motion provides movement so that the entire surface of said part is subjected to said beam.

6. A method of determining variations in thicknesses of an optical part interferometrically comprising the steps of, focusing a converging monochromatic light beam through said optical part and receiving a return beam containing wavefronts reflected off the inner and outer surfaces of said optical part which define Newton interference fringe patterns, providing relative motion between said beam and said optical part, and detecting said interference fringes and determining thickness variations in said optical part by the change in space, position and intensity of said interference fringes.

7. The method as claimed in claim 6 including the further step of mapping the entire surface of said optical part so that each variation in thickness can be located.

8. An IR interferometric thickness test apparatus for determining any variation in thickness of an IR optical part under test comprising, a monochromatic optical system generating and focusing a converging beam through the optical part and generating and detecting a return beam containing interference fringes due to the reflections off the inner and outer surfaces of the optical part, the focal point of said beam being beyond the inner surface of said optical part, said optical system being spaced from said optical part and said surfaces forming an optical cavity whose optical path difference equals $2n\Delta t$.

9. An interferometer test apparatus for determining any variation in thickness of an optical part comprising:

an optical system for directing and focusing a monochromatic light source into a converging beam and directing said beam near normal to the optical part and through the front and back surfaces of said part and for detecting Newton fringes arising from the interaction of two wavefronts produced by the reflection of said beam off the back and front surfaces, said optical system being spaced from said optical part and arranged such that any change in distance between said optical system and said optical part only changes the size of the area of the front and back surfaces being subjected to said beam, and means for relative movement between said optical system and said optical part so that said beam illuminates adjacent surface areas of said optical part which causes changes in light intensity of said Newton fringes if the spacing between said back and front surfaces varies.

10. The apparatus as claimed in claim 9 including a detector for receiving said Newton fringes and measuring the light intensity of the fringes and generating signals representative of said light intensity and thickness variations of the optical part.

11. The apparatus as claimed in claim 10 including means for counting the number of interference peaks produced by changes in the Newton fringe pattern during relative movement between the optical system and the optical part to provide a direct measurement of the thickness variation of the optical part.

12. The apparatus as claimed in claim 11 wherein said direct measurements of the thickness variations of the optical part is in fractions of a wavelength of the monochromatic source light (microinches or less).

13. The apparatus as claimed in claim 12 including means for monitoring the slope of the intensity variation at the first ring of the interference pattern to provide an indication of the direction of thickness change of the optical part as long as the relative movement between said optical system and optical part continues.

14. The apparatus as claimed in claim 13 wherein the entire surface of said optical part is subjected to said beam thereby providing thickness variation measurements of the entire surface of said optical part.

15. A method of interferometrically determining variations in a thickness of a optical part comprising the steps of, providing an optical system which directs a converging monochromatic beam through the said optical part to a focal point of said beam being beyond said optical part thereby forming an interferometer optical cavity within said optical part and forming a standing wave Newton fringe pattern arising through the interaction of two wavefronts by the reflection off the two surfaces of said optical part, and providing relative movement between said optical beam and optical part to provide changes in light intensity of said standing wave fringe pattern if there is a change in the distance between the two surfaces.

16. The method as claimed in claim 15 further including the step of detecting said standing wave Newton fringe pattern and dividing said pattern into areas so that the light intensity of each of the areas is counted, averaged, measured and displayed on a monitor.

* * * * *